United States Patent
Kobayashi et al.

(10) Patent No.: US 6,683,642 B1
(45) Date of Patent: Jan. 27, 2004

(54) DIGITAL CAMERA USING SEPARATE BUSES FOR TRANSFERRING DMA PROCESSED DATA AND CPU PROCESSED DATA

(75) Inventors: Akio Kobayashi, Kyotanabe (JP); Toru Asaeda, Daito (JP); Hidefumi Okada, Daito (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/306,764

(22) Filed: May 7, 1999

(30) Foreign Application Priority Data

May 11, 1998 (JP) ............................................ 10-127339

(51) Int. Cl.[7] .......................... H04N 5/76; H04N 5/225; H04N 9/04
(52) U.S. Cl. ............................... 348/231.2; 348/231.99; 348/207.99
(58) Field of Search ........................ 348/231.99, 231.1, 348/231.2, 231.3, 231.4, 231.5, 231.6, 231.7, 231.8, 231.9, 222.1, 207.99, 207.1, 207.11, 552; 710/306, 308, 310, 22, 27

(56) References Cited

U.S. PATENT DOCUMENTS

| 5,335,321 A | * | 8/1994 | Harney et al. | 345/503 |
|---|---|---|---|---|
| 5,640,543 A | * | 6/1997 | Farrell et al. | 345/502 |
| 5,963,717 A | * | 10/1999 | Imamura | 358/1.15 |
| 6,219,628 B1 | * | 4/2001 | Kodosky et al. | 703/2 |
| 6,243,108 B1 | * | 6/2001 | Takiyama et al. | 345/537 |
| 6,282,462 B1 | * | 8/2001 | Hopkins | 700/259 |
| 6,429,896 B1 | * | 8/2002 | Aruga et al. | 348/231.99 |

FOREIGN PATENT DOCUMENTS

| JP | 05-227506 | 9/1993 |
|---|---|---|
| JP | 05-346946 | 12/1993 |
| JP | 07-298112 | 11/1995 |

* cited by examiner

Primary Examiner—Vu Le
Assistant Examiner—Justin Misleh
(74) Attorney, Agent, or Firm—Armstrong, Kratz, Quintos, Hanson & Brooks, LLP (57) ABSTRACT

A digital camera includes a mode set switch. If a camera mode is set by mode set switch, the image data corresponding to a subject image taken by a CCD imager is processed by DMA, and outputted through a first bus onto a monitor. If a shutter button is operated, the first bus is connected to a second bus by a bus bridge and the image data is transferred from a first bus side to a second bus side. On the second bus side, the CPU processes the image data according to a program and records it on a memory card.

13 Claims, 10 Drawing Sheets

| | | 28(36) | | | |
|---|---|---|---|---|---|
| 31 | $U_{30}$ | $V_{30}$ | $U_{31}$ | $V_{31}$ | |
| ⋮ | | | | | |
| 17 | $U_2$ | $V_2$ | $U_3$ | $V_3$ | |
| 16 | $U_0$ | $V_0$ | $U_1$ | $V_1$ | BANK 1 |
| 15 | $Y_{60}$ | $Y_{61}$ | $Y_{62}$ | $Y_{63}$ | |
| ⋮ | | | | | |
| 1 | $Y_4$ | $Y_5$ | $Y_6$ | $Y_7$ | |
| 0 | $Y_0$ | $Y_1$ | $Y_2$ | $Y_3$ | |
| 31 | $U_{30}$ | $V_{30}$ | $U_{31}$ | $V_{31}$ | |
| ⋮ | | | | | |
| 17 | $U_2$ | $V_2$ | $U_3$ | $V_3$ | |
| 16 | $U_0$ | $V_0$ | $U_1$ | $V_1$ | BANK 2 |
| 15 | $Y_{60}$ | $Y_{61}$ | $Y_{62}$ | $Y_{63}$ | |
| ⋮ | | | | | |
| 1 | $Y_4$ | $Y_5$ | $Y_6$ | $Y_7$ | |
| 0 | $Y_0$ | $Y_1$ | $Y_2$ | $Y_3$ | |

DIGITAL CAMERA USING SEPARATE BUSES FOR TRANSFERRING DMA PROCESSED DATA AND CPU PROCESSED DATA

BACKGROUND OF THE INVENTION

1. Field of the Invention

The present invention relates to digital cameras and, more particularly, to a digital camera which transfers through a bus image to be processed or having been processed through DMA (Direct Memory Access) (DMA Processed Data) and the image data to be processed or having been processed through CPU (CPU Processed Data).

2. Description of the Related Art

In the conventional digital cameras of this kind, where displaying real-time motion pictures, for example, on a monitor, the image data transferred from the CCD imager through a bus is processed by DMA and outputted to the monitor through the bus. On the other hand, where recording still picture data onto a recording medium responsive to operation of the shutter button, the still picture data upon pressing the shutter button is processed by the CPU and outputted to the recording medium via the bus. In these operations, the DMA processed data and the CPU processed data are transferred through the common bus.

However, if the common bus is used in transferring high-speed DMA processed data and low-speed CPU processed data, one of the data adversely affects the other, thus resulting in a problem of reducing operational efficiency. That is, there has been a case that CPU processing is delayed as a result of a high occupation ratio over the bus or DMA processed data is prevented from transferring by the reduction in CPU processing speed.

SUMMARY OF THE INVENTION

Therefore, it is a primary object of this invention to provide a digital camera which is capable of processing data with efficiency.

In accordance with the present invention, a digital camera, comprises: a picture taking means for taking a picture of a photographic subject and outputting image data; a display means for displaying an image corresponding to the image data; a compression means for compressing the image data and outputting compressed image data; a first bus for connecting between said picture taking means, said display mean sand said compression means; a main memory; an access means connected to said first bus and making access to said main memory through DMA to write/read the image data and the compressed image data; a second bus; a bus bridge for connecting between said first bus and said second bus as required; and a CPU connected to said second bus and preforming a predetermined processing on the compressed image data according to a program.

The image data outputted from the picture taking means is supplied to the access means through the first bus, and written to the main memory through DMA by the access means. The image data written on the main memory is thereafter read through DMA by the same access means, and supplied through the first bus onto the display means. As a result, an image is displayed corresponding to the image data. The image data read out by the access means also is supplied through the first bus to the compression means. The compression means compresses the given image data to output compressed image data. The compressed image data output is given to the access means via the first bus, and written to the main memory through DMA. The compressed image data is thereafter read out by the access means, and supplied to the CPU via the second bus. The CPU processes the compressed image data thus given according to a predetermined program.

According to this invention, DMA processed data is transferred using the first bus whereas CPU processed data is transferred with the second bus, thus enabling data processing with efficiency.

In one aspect of the present invention, if an instruction to record image data is inputted by the record instruction input means, the CPU disables the picture taking means and enables the compression means in response to this record instruction. The CPU further turn on the bus bridge to fetch the compressed image data onto the second bus side and record the compressed image data in the recording medium.

In another aspect of the present invention, the second bus is connected with a focus control means and a strobe control means. The focus control means controls on focusing according to an instruction by the CPU, while the strobe control means controls strobe also according to a CPU instruction.

In still another aspect of the present invention, the data output means is connected to the second bus so that this data output means outputs the compressed image data to an outside, according a CPU instruction.

In a further aspect of the present invention, the image data taken by the picture taking means is stored through DMA to the first buffer connected to the first buffer. Also, the image data read from the main memory is temporarily held in the second buffer and thereafter read out through DMA. The read image data is outputted onto a monitor, resulting in displaying a corresponding image on the monitor. The image data read from the main memory also supplied through a third buffer to the compression processing means where it is subjected to a predetermined compression processing. The obtained compressed image data is supplied through a fourth buffer to an access means so that it is stored in the main memory.

In one embodiment of the present invention, the access means includes a buffer access means and a main memory access means. The buffer access means makes access to the first to fourth buffers through DMA. The main memory access means also makes access to main memory through DMA. That is, the buffer access means reads the image data from the first buffer in response to a read request from the picture taking means, and writes the image data to the second buffer in response to a write request from a display means. The buffer access means also writes the image data to the third buffer in response to a write request from a third request output means included in the compression means, and reads the compressed image data from the fourth buffer in response to a read request from a fourth request output means.

The access means further includes an on/off means to turn on/off the bus bridge. If an image data record instruction is inputted by a record instruction input means, the CPU disables the first request output means and enables the third request output means, in response to the record instruction. The CPU further causes the on/off means to turn on the bus bridge, and requests the access means to read the compressed image data. The compressed image data read out of the main memory by the access means is supplied to the CPU via the second bus.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 5(A) is a waveform diagram showing a horizontal synchronizing signal;

FIG. 5(B) is an illustrative view showing Y data;

FIG. 5(C) is an illustrative view showing UV data;

FIGS. 5(D) and (E) are illustrative views showing outputs of a B-FF circuit;

FIG. 5(F) is a waveform diagram showing a SW signal;

FIG. 5(G) is an illustrative view showing an output of SW;

FIG. 5(H) illustrative view showing an address signal;

FIG. 5(I) is a waveform diagram showing a bank switching signal;

FIG. 5(J) is a waveform showing a read-out request;

FIG. 5(K) is an illustrative view showing an address signal;

FIG. 5(L) is an illustrative view showing a buffer output;

FIG. 8(A) is a waveform diagram showing a horizontal synchronizing signal;

FIG. 8(B) is a waveform diagram showing a bank switch signal;

FIG. 8(C) is an illustrative view showing an address signal;

FIG. 8(D) is an illustrative view showing a buffer output;

FIGS. 8(E) and (F) are illustrated views showing outputs of a D-FF circuit;

FIG. 8(G) is a waveform diagram showing an SW signal;

FIG. 8(H) is an illustrative view showing an output of SW;

FIG. 8(I) is an illustrative view showing an output of the D-FF circuit;

FIG. 8(J) is a waveform diagram showing an SW signal;

FIGS. 8(K) and (L) are illustrative views showing outputs of SW;

FIGS. 8(M) and (N) are illustrative views showing outputs of the D-FF circuit;

DETAILED DESCRIPTION OF THE PREFERRED EMBODIMENTS

Figure 1:
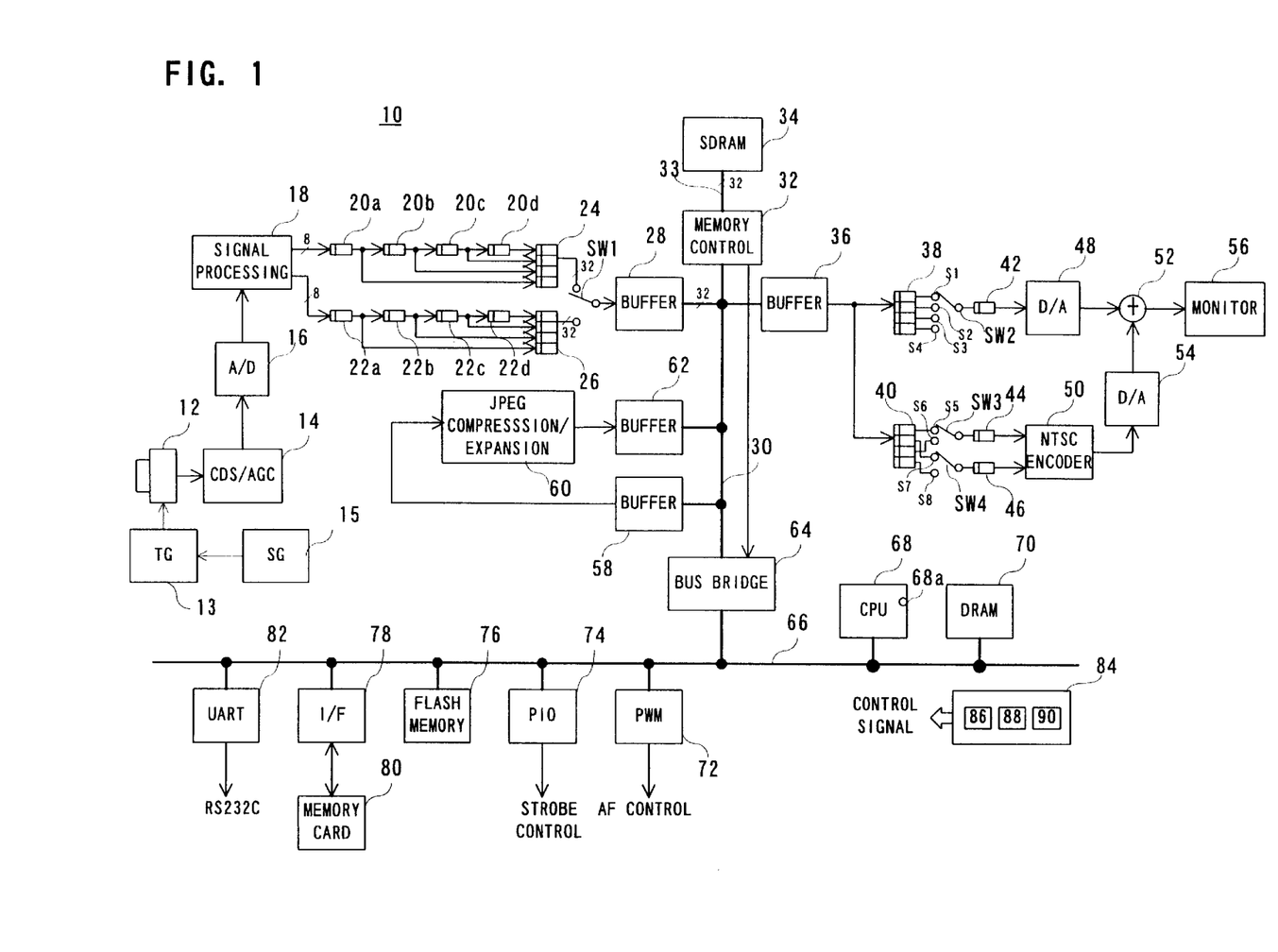
FIG. 1 is a block diagram showing one embodiment of the present invention.

Referring to FIG. 1, a digital camera 10 of this embodiment includes a CCD imager 12. The CCD imager 12 is mounted, at its front, with a primary color filter (not show) so that a subject optical image can be taken to the CCD imager 12 through this primary color filter.

The CCD imager 12 is driven by a timing signal outputted from a timing generator (TG) 13 in accordance with camera mode setting. That is, if an operator sets a mode set switch 86 to a camera side, a system controller 84 supplies a control signal to a CPU 68 through an interrupt terminal 68a. Thereupon the CPU 68 causes a signal generator (SG) 15 to start so that the signal generator (SG) 15 outputs a horizontal synchronizing signal and vertical synchronizing signal. The TG 13 creates a timing signal based on the horizontal synchronizing and vertical synchronizing signals to drive the CCD imager 12 in a progressive scan scheme. That is, the camera signal reading from the CCD imager 12 is commenced in the progressive scan scheme by merely starting the SG 15 from the CPU 68.

The camera signal outputted from the CCD imager 12 is a primary-colored signal consisting of color components R, G and B for each pixel. The outputted camera signal is subjected to well-known noise removal and level adjustment by a CDS/AGC circuit 14, and then converted into digital-signal camera data by an A/D converter 16 operating at a clock rate of 12 MHz. A signal processing circuit 18 performs YUV conversion with a ratio of 4:2:2 on the camera data outputted from the A/D converter 16, thus creating image data, namely YUV data.

The signal processing circuit 18 also effects signal processing at a clock rate of 12 MHz as above depending upon the horizontal synchronizing and vertical synchronizing signals supplied from the SG 15. As a result, outputted simultaneously are Y data shown in FIG. 5(B) and UV data shown in FIG. 5(C) through respective two signal routes. Incidentally, each of Y data, U data and V data is 8 bits per pixel.

The Y data is inputted, pixel by pixel, into four D-FF circuits 20a–20d connected in serial. The D-FF circuits 20a–20d have their output to be simultaneously inputted to a D-FF circuit 24. That is, 4 pixels or 32 bits of Y data are simultaneously inputted to the D-FF circuit 24. On the other hand, U data and V data are alternately outputted every 8 bits. Each of the U data and V data has a half data mount of the Y data. Accordingly, 4 pixels of Y data are outputted through one signal bus during which 2 pixels of U data and V data are outputted through the other signal bus. These 2-pixels U and V data are also simultaneously inputted to a D-FF circuit 26 through D-FF circuits 22–22d.

Figure 5:
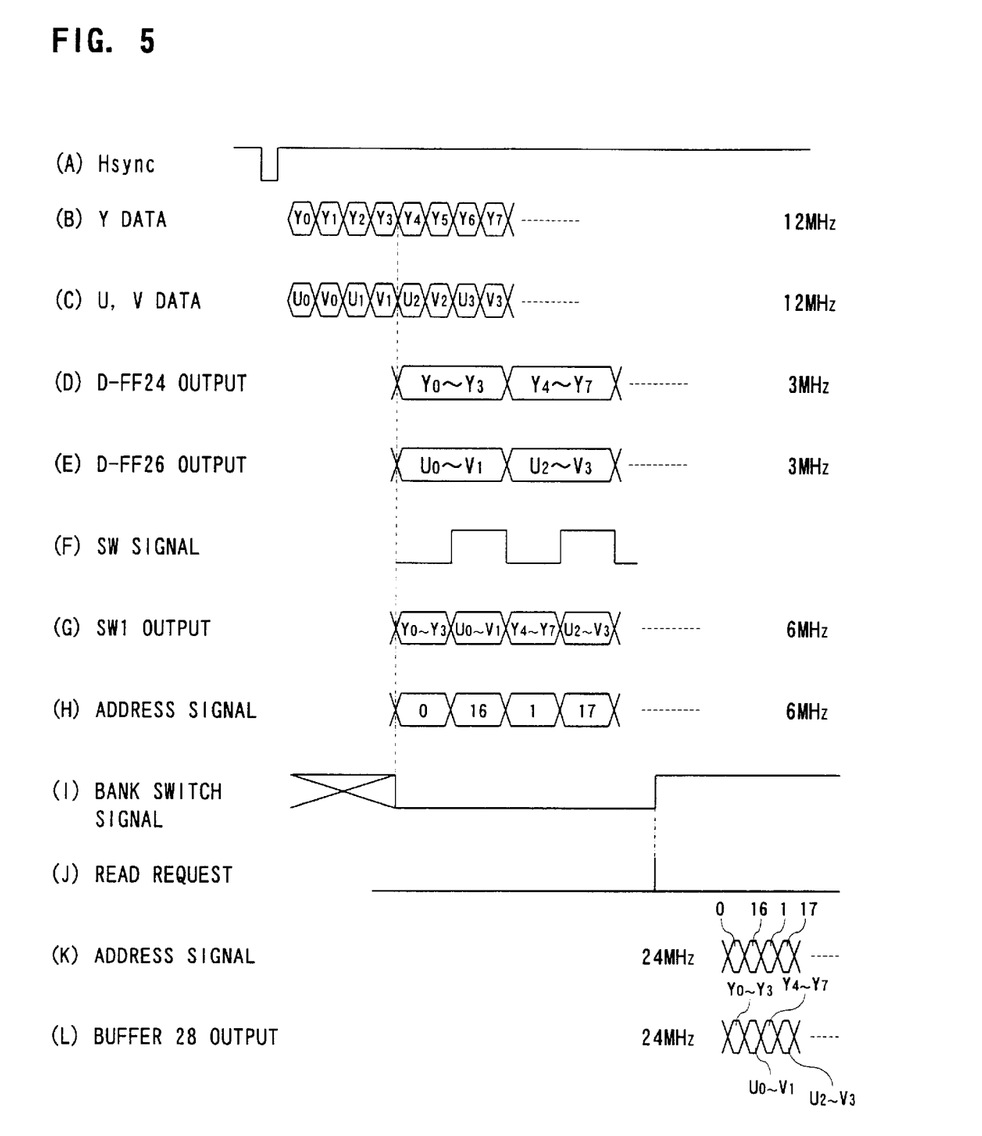

The D-FF circuits 24 and 26 operate at a clock rate of 3 MHz. As a result, Y data and UV data are respectively outputted from the D-FF circuits 24 and 26 at an interval of 32 bits and in timing of FIG. 5(D) and FIG. 5(E). A switch SW1 is switched by a SW signal, as shown in FIG. 5(F). Due to this, time division multiplex is made on the outputs of the D-FF circuits 24 and 26. The time-divisionally multiplexed YUV data is outputted from the switch SW1, as shown in FIG. 5(G). This YUV data has a transfer rate of 6 MHz. Incidentally, the D-FF circuits 20a–20d, 22a–22d, 24 and 26 as well the switch SW1 operate in compliance with the timing signal given from the TG 13.

Figure 2:
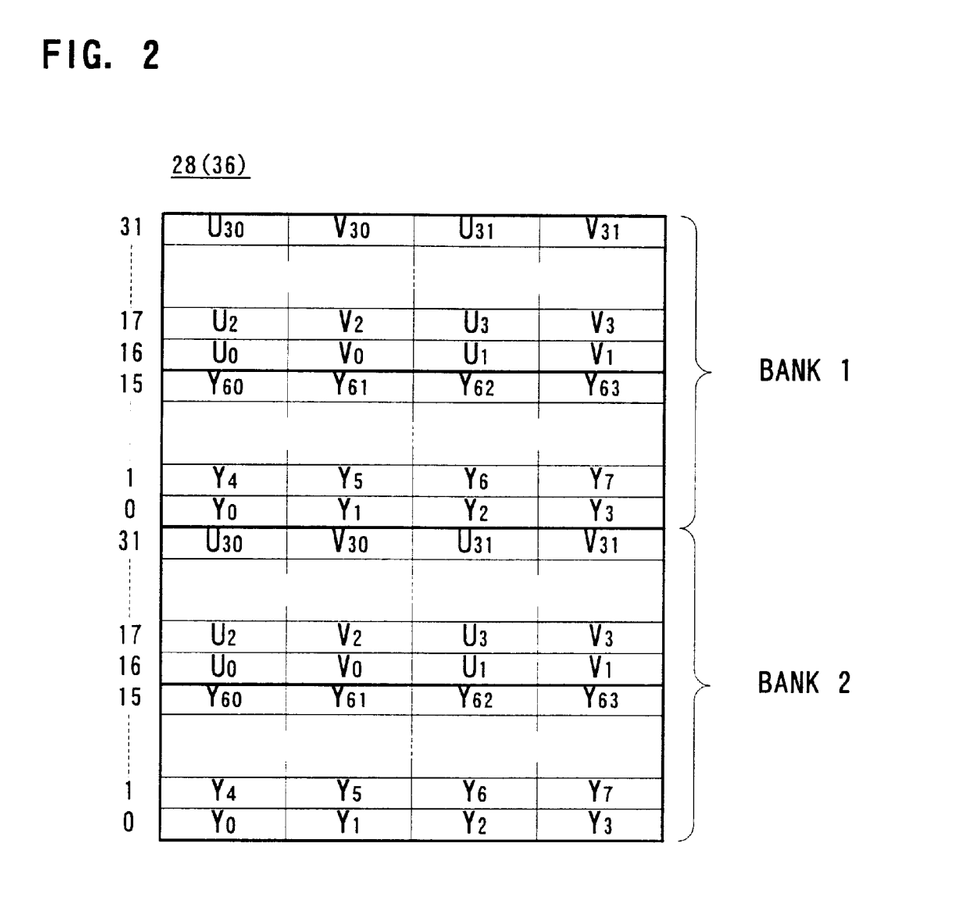
FIG. 2 is an illustrative view showing a buffer.

The buffer 28 is configured by a dual-port SRAM, as shown in FIG. 2. The buffer has a memory area divided into two banks. Each bank has the number of words "32" wherein each word has a capacity of 32 bits. Consequently, each bank can afford to store 64 pixels of YUV data. The YUV data outputted through the switch SW1 is inputted to the buffer 28 constructed as above. A signal processing circuit 18 supplies an address signal shown in FIG. 5(H) and a bank switch signal shown in FIG. 5(I) to the buffer 28, in synchronism with the YUV data. As a result, 64 pixels of YUV data is written onto the bank in an alternate fashion. Meanwhile, in each bank Y data is stored in a former half of 16 words and UV data is in a latter half of the 16 words. In this manner, the YUV data outputted through the SW1 is written on the buffer 28 through DMA (Direct Memory Access).

The YUV data within each bank is read out by a memory control circuit 32, namely through DMA, before the succeeding YUV data be written thereon. Specifically, the signal processing circuit 18 sends a read request shown in FIG. 5(J) to the memory control circuit 32 in synchronism with rise and fall in the bank switch signal so that the memory control circuit 32 responds to the read request and reads the YUV data out of the bank. The memory control circuit 32 outputs an address signal at a rate of 24 MHz as shown in FIG. 5(K), and reads YUV data out of the buffer 28 as shown in FIG. 5(L). Incidentally, the write and read operations onto and from the buffer 28 are carried out in a complementary fashion wherein, when data is being written onto one bank, data reading is carried out from the other bank.

Figure 3:
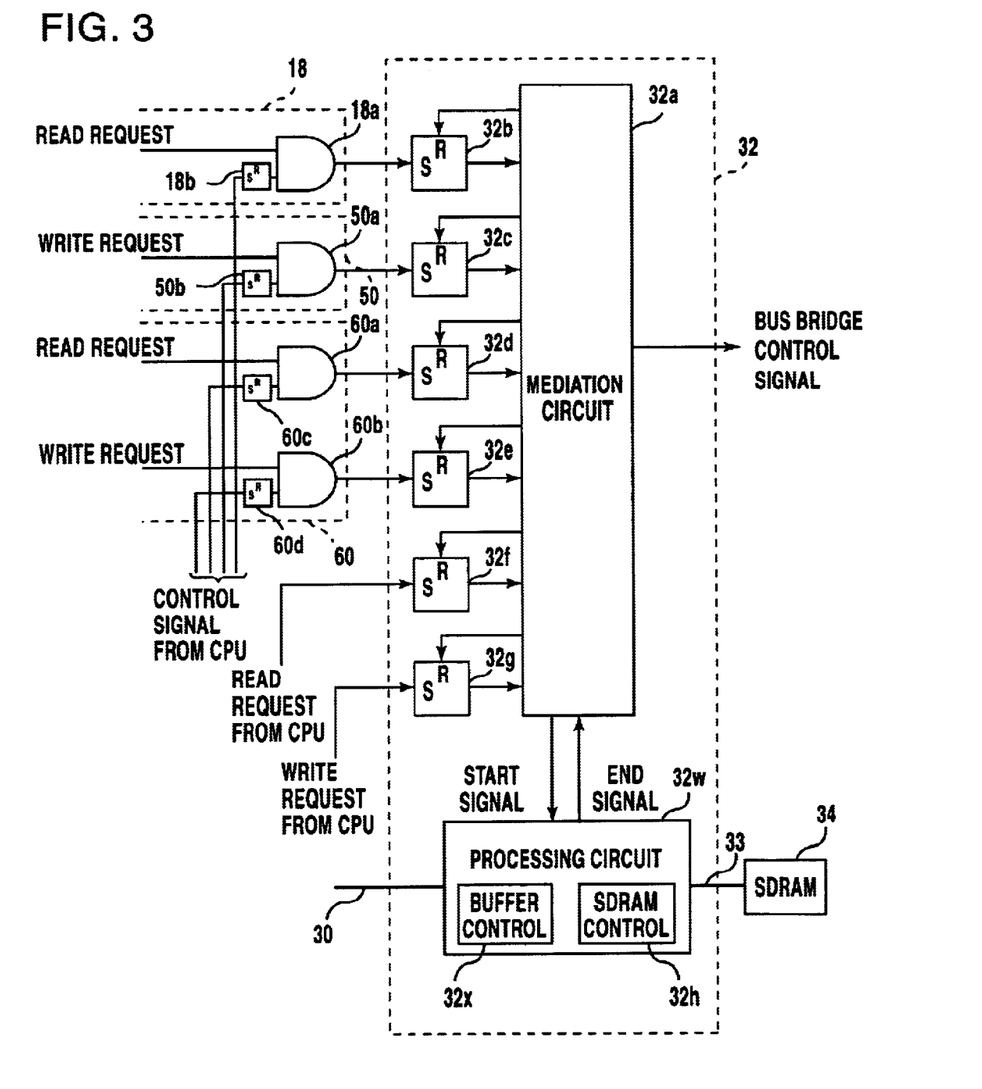
FIG. 3 is a block diagram showing part of the FIG. 1 embodiment.

Referring to FIG. 3, if a camera mode is set, the CPU 68 supplies a control pulse to the signal processing circuit 18. This control pulse is latched by an RS-FF circuit 18b so that the RS-FF circuit 18b provides a high level gate signal to an AND circuit 18a. With this signal the gate is opened to cause the signal processing circuit 18 outputting a read request. The read request is inputted to a mediation circuit 32a through an RS-FF circuit 32b provided in the memory control circuit 32. The mediation circuit 32a receives also other requests from RS-FF circuit 32c–32g, thus conducting mediations between the requests. In order to respond to any of the requests, a predetermined start signal is outputted to a processing circuit 32w.

Figure 4:
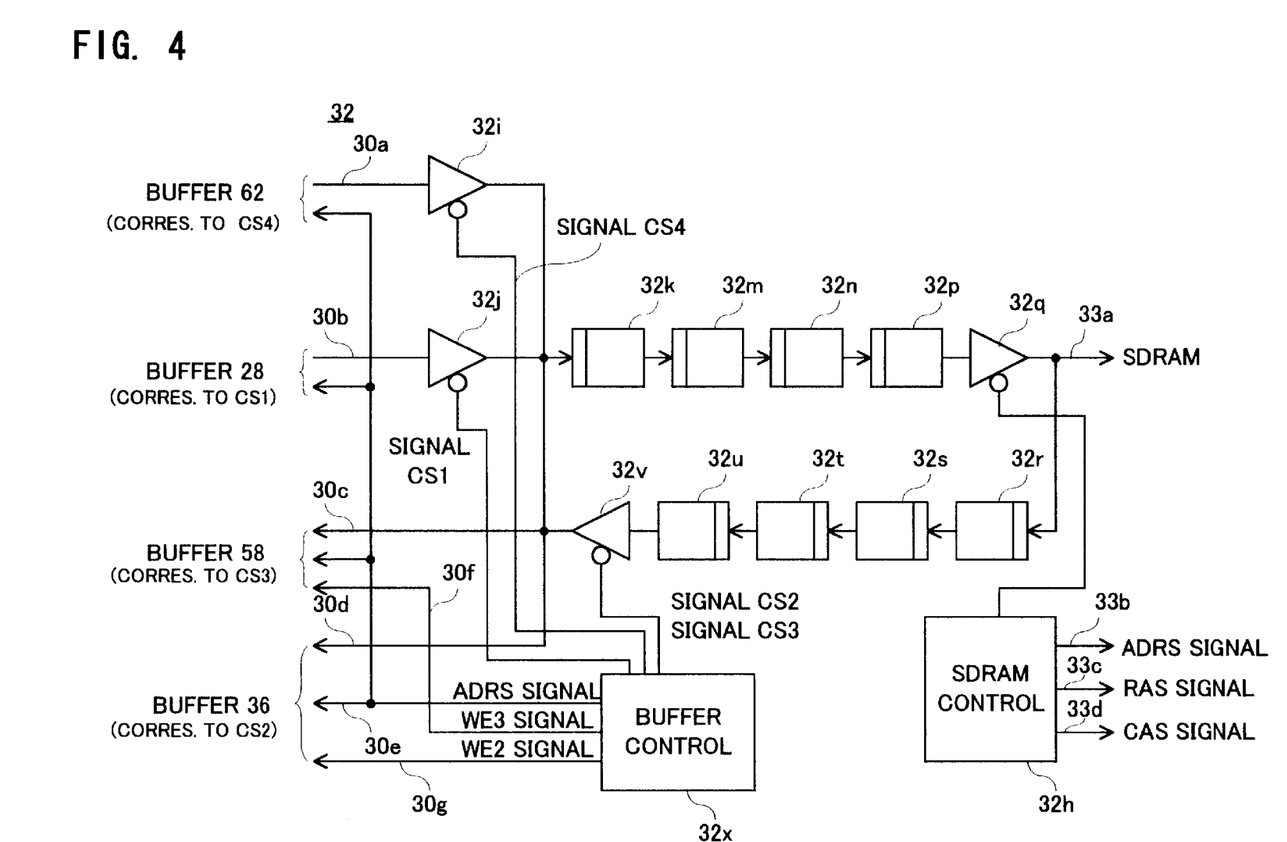
FIG. 4 is a block diagram showing another part of the FIG. 1 embodiment.

The processing circuit 32w has a configuration as shown in FIG. 4. A bus 30 includes data buses 30a–30d, address bus 30e and control buses 30f and 30g. The data buses 30a and 30b are connected to respective input terminals of 3-state buffers 32i and 32j. The data buses 30c and 30d are commonly connected to the output terminals of the 3-state buffers 32i, 32j and 32v and to an output terminal of a D-FF circuit 32k. The address bus 30e and the control buses 30f and 30g are connected to a buffer control circuit 32x.

D-FF circuits 32k–32p are connected in serial, wherein the D-FF circuit 32p has an output terminal connected to an input terminal of the 3-state buffer 32q. The 3-state buffer 32q has an output terminal connected to SDRAM 34 through a data bus 33a included in the bus 33. D-FF circuits 32r–32u are inserted in serial connection between the output terminal of the 3-state buffer 32q and the input terminal of the 3-state buffer 32v. The 3-state buffers 32i, 32j and 32v are turned on/off by the buffer control circuit 32x, whereas the 3-state buffer 32q is turned on/off by an DRAM control circuit 32h.

Upon processing the read request from the signal processing circuit 18, the processing circuit 32w responds to a start signal as shown in FIG. 6(A) and outputs an address signal shown in FIG. 6(B) to the buffer 28, fetching YUV data shown in FIG. 6(C) from the buffer 28. The fetched YUV data is written through DMA onto the SDRAM 34. At this time, the processing circuit 32w performs the process at a clock rate of 24 MHz.

Explaining in greater detail, the buffer control circuit 32x outputs the above-mentioned address signal through an address bus 30e, and makes a chip select signal CS1 low in level to turn on the 3-state buffer 32j. Furthermore, the SDRAM control circuit 32h turns on the 3-state buffer 32q. Due to this, the YUV data fetched from the buffer 28 is outputted to the SDRAM 34 in timing shown in FIG. 6(H), through the D-FF circuits 32k–32p. That is, because four D-FF circuits 32k–32p are interposed between the 3-state buffers 32i and 32j, the fetched YUV data is outputted to the SDRAM 34 is a delay of 4 clocks.

The SDRAM control circuit 32h also outputs to the SDRAM 34 an address signal, RAS signal and CAS signal shown in FIGS. 6(D)–(F). The address signal is outputted to the SDRAM 34 through an address bus 33b whereas the RAS signal and the CAS signal are outputted to the SDRAM 34 through control buses 33c and 33d. The address signal first designates a row address and then, during a succeeding 4-clocks period, a column address. The RAS signal falls simultaneously with designating the row address, while the CAS signal falls at a point of time of designating the column address. This allows the SDRAM 34 to recognize four addresses and writes 32 bits of YUV data shown in FIG. 6(H) onto each of desired four addresses. Such operations are carried out up to 64 pixels. The processing circuit 32w supplies an end signal to the mediation circuit 32a each time the 64-pixels YUV data have been written, and the mediation circuit 32a enters to a process for a next request. In this manner, read requests from the signal processing circuit 18 are processed a plurality of number of times, with a result that 1 screen of YUV data is written to the SDRAM 34.

The YUV data written on the SDRAM 34 is read out of the SDRAM 34 by the interlace scan scheme based on a request from the NTSC encoder 50, and written onto the buffer 36.

Figure 7:
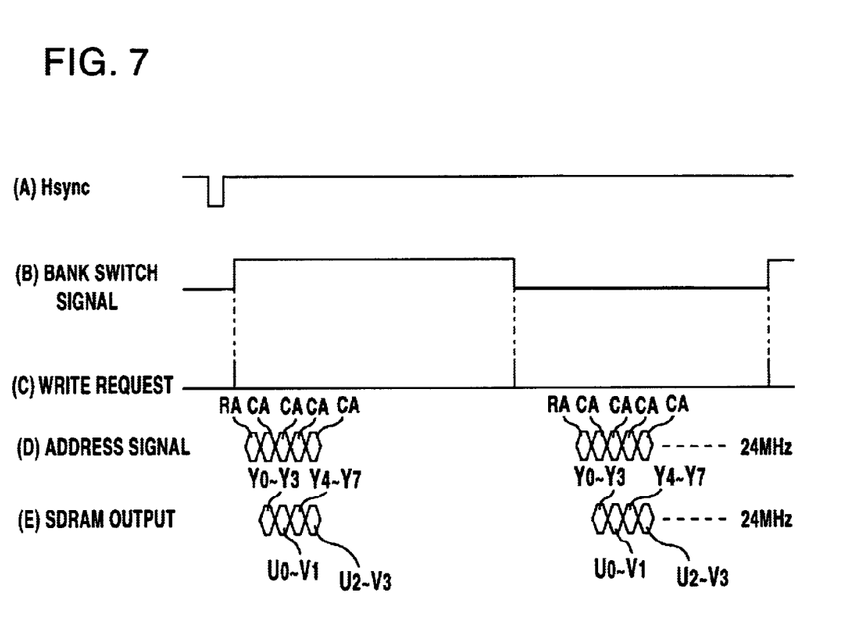
FIG. 7(A) is a waveform diagram showing a horizontal synchronizing signal.
FIG. 7(B) is a waveform diagram showing a bank switch signal.
FIG. 7(C) is a waveform diagram showing a write request.
FIG. 7(D) is an illustrative view showing an address signal.
FIG. 7(E) is an illustrative view showing an SDRAM output.

More specifically, the NTSC encoder 50 outputs to the memory control circuit 32 a write request to demand writing onto the buffer 36 in timing shown in FIG. 7(C), based on the horizontal synchronizing and vertical synchronizing signals outputted from the SG 15. On this occasion, the NTSC encoder 50 receives a control pulse from the CPU 68. The RS-FF circuit 50b shown in FIG. 3 creates a high level gate signal from this control pulse. Due to this, a write request is inputted to the memory control circuit 32 via an AND circuit 50a.

The mediation circuit 32 responds to write request and outputs a predetermined start signal to the processing circuit 32w. In response, the SDRAM control circuit 32h shown in FIG. 4 supplies a 24-MHz address signal shown in FIG. 7(D) to the SDRAM 34. The YUV data is read out of the SDRAM 34 at a clock rate of 24 MHz, as shown in FIG. 7(E). On the other hand, the buffer control circuit 32x renders the chip select signal CS low level, and outputs an address signal and write enable signal WE2 to the buffer 36 through the address bus 30e and control bus 30g.

The buffer 36 is configured as shown in FIG. 2, that is, it is formed by a dual-port SRAM similarly to the buffer 28, to have a memory area possessing two banks. With such a configuration, the NTSC encoder 50 switches the level of a bank switch signal in synchronism with the write request, as shown in FIG. 7(B). Consequently, the YUV data inputted from the memory control circuit 32 to the buffer 36 is written onto a specified bank by the bank switch signal. In this manner, the YUV data is read from the SDRAM 34 through DMA, and written to the buffer 36 by DMA.

Figure 8:
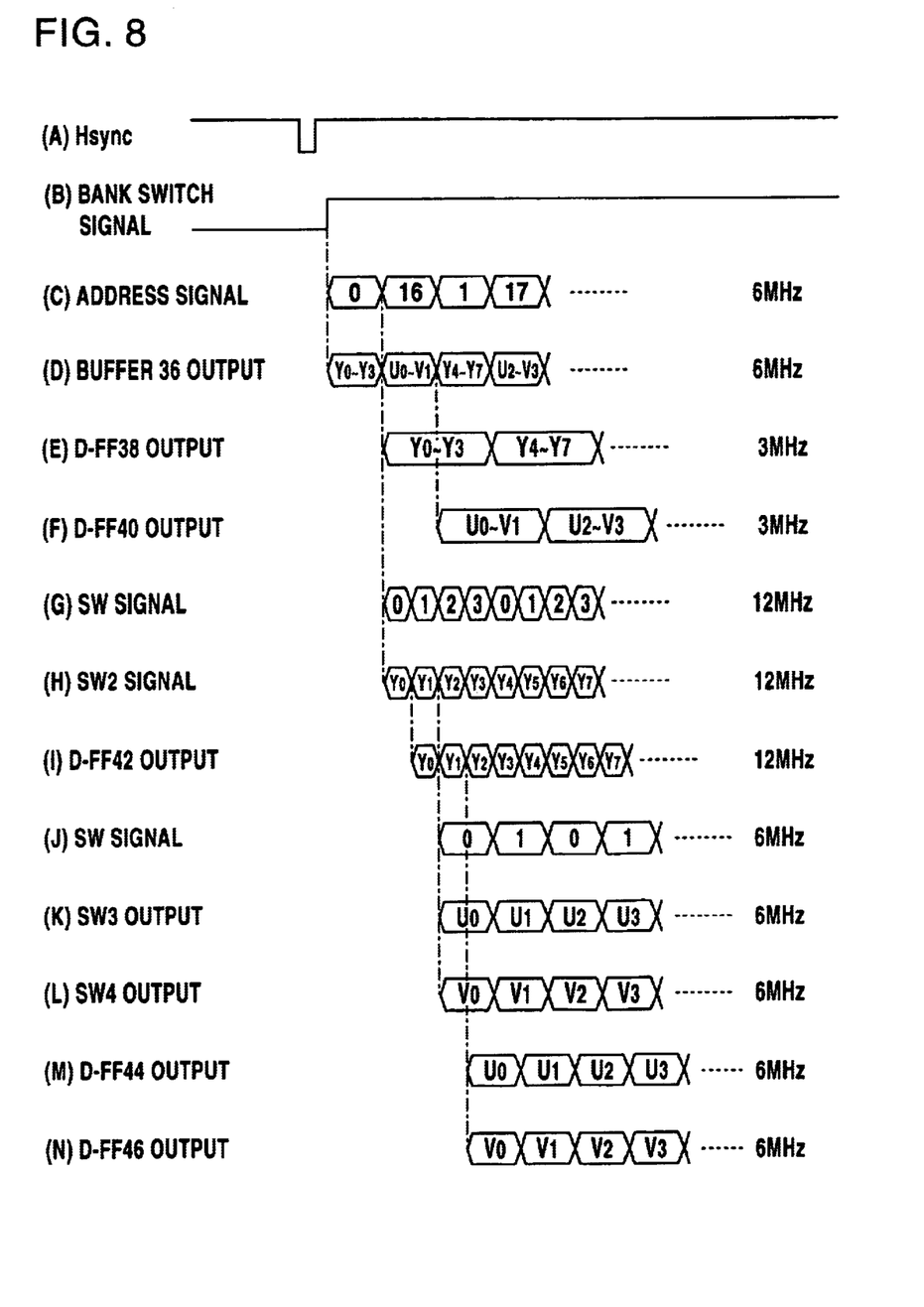

Referring to FIG. 8, the NTSC encoder 50 supplies a 6-MHz address signal shown in FIG. 8(C) through the buffer 36, simultaneously with switching over the bank. Due to this, the YUV data stored within the buffer 36 is read out at a clock rate of 6 MHz, as shown in FIG. 8(D). The reading from the buffer 36 is also by DMA. The YUV data thus read out is latched by the D-FF circuits 38 and 40 at different in timing from each other. The clock rate of the D-FF circuits 38 and 40 given from the TG 13 is 3 MHz. Accordingly, Y data is outputted by the D-FF circuit 38 at timing shown in FIG. 8(E), while UV data is outputted from the D-FF circuit 40 at timing shown in FIG. 8(F).

The TG 13 also supplies an SW signal shown in FIG. 8(G) to a switch SW2, and an SW signal shown in FIG. 8(J) to switches SW3 and SW4. The SW signal of FIG. 8(G) is controlled in synchronism with a 12-MHz clock, while the SW signal of FIG. 8(J) is controlled in synchronism with a 6-MHz clock. The switch SW2 is connected to terminals S1–S4 when the SW signal respectively assumes values "0"–"3". Also, the switches SW3 and SW4 is connected to respective terminals S5 and S7 when the SW signal is at "0", and to terminals S6 and S8 when the SW signal is at "1". Accordingly, the Y data is outputted through the switch SW2 at a clock rate of 12 MHz, as shown in FIG. 8(H). Also, the U data is outputted through the switch SW3 at a clock rate of 6 MHz as shown in FIG. 8(K), while the V data is through the switch SW4 at a clock rate of 6 MHz as shown in FIG. 8(L).

The Y data outputted through the switch SW2 is supplied to a D/A converter 48 through a D-FF circuit 42 in timing shown in FIG. 8(I), where it is converted into an analog Y signal. On the other hand, the respective U and the V data outputted through the switches SW3 and SW4 are inputted to the NTSC encoder 50 through D-FF circuits 44 and 46 in timing shown in FIGS. 8(M) and (N). The encoded data by the NTSC encoder 50 is thereafter converted by a D/A converter 54 into an analog signal. The outputs of the D/A converters 48 and 54 are added together by an adder 52 so that an add signal is outputted onto a monitor 56. As a result, motion pictures are displayed in real time on the monitor 56.

As described above, in the camera mode the image data is accessed through DMA to the buffer 28 and 36 and SDRAM 34. That is, the CPU 68 has no bearing on the image data processing, except for starting the SG1 5 upon setting the camera mode to supply a control pulse to the signal processing circuit 18 and NTSC encoder 50.

Figure 6:
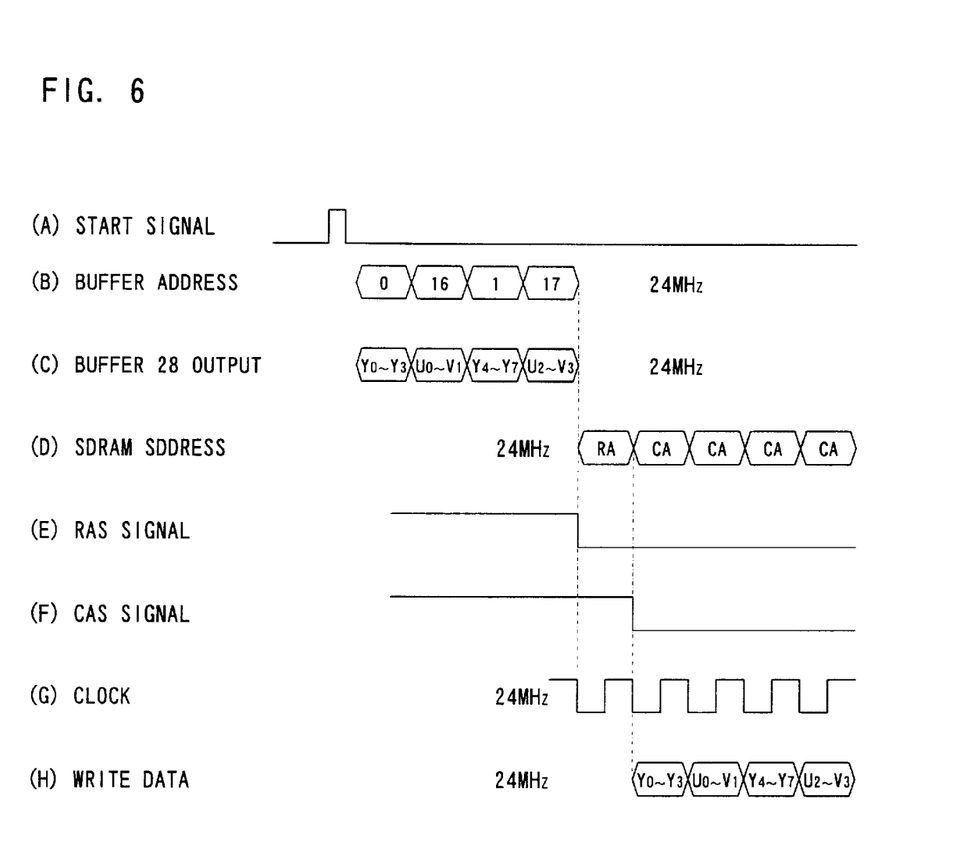
FIG. 6(A) is a waveform diagram showing a start signal.
FIG. 6(B) is an illustrative view showing an address signal.
FIG. 6(C) is an illustrative view showing a buffer output.
FIG. 6(D) is an illustrative view showing an address signal.
FIG. 6(E) is a waveform diagram showing an RAS signal.
FIG. 6(F) is a waveform diagram showing a CAS signal.
FIG. 6(G) is a waveform diagram showing a clock.
FIG. 6(H) is an illustrative view showing write data.

If the operator manipulates a shutter button 88, the CPU 68 applies gating to a read request outputted from the signal processing circuit 18. Specifically, the CPU 68 resets the RS-FF circuit 18b shown in FIG. 3 to make low the level of a gate signal to be inputted to the AND circuit 18a. Incidently, the RS-FF circuit 32b provided at a front stage of the mediation circuit 32a is reset at a predetermined interval by the mediation circuit 32a with a result that the RS-FF circuit 32b has an output maintained low in level. Accordingly, while the read request is being applied gating, the operations of FIGS. 5(K) and (L) and FIG. 6 are suspended without reading image data out of the buffer 28. The bus 30 is left open correspondingly to the suspension of operation.

The memory control circuit 32 has a process rate of 24 MHz which is four times higher than the processing speed of the signal processing circuit 18. As a result of this, in the camera mode the bus 30 is occupied for ¼ of the total time to transfer the image data read from the buffer 28. However, this operation is suspended by manipulating a shutter button 88, whereby the bus 30 is released open for ¼ of the total time. The CPU 68 utilizes this bus-released duration to compress the image data stored within the SDRAM 34, thereby fetching compressed image data onto a bus 66 side. Incidently, the write operation to the buffer 36 is continued, whereby a freeze picture upon operating the shutter button 88 is displayed on a monitor 56.

The CPU 68 also supplies a control pulse to RS-FF circuits 60c and 60d provided in a JPEG compression/decompression circuit 60 shown in FIG. 3, opening the gates of AND circuits 60a and 60b. As a result, read and write requests are inputted in predetermined timing from the JPEG compression/decompression circuit 60 to the memory control circuit 32. Incidently, the write request is to demand writing of the image data of the SDRAM 34 onto a buffer 58 whereas the read request is to demand reading of the compressed image data stored within the buffer 62. Consequently, a write request is inputted prior to inputting a read request.

The mediation circuit 32a first supplies a start signal corresponding to the write request to the processing circuit 32w. The buffer control circuit 32x shown in FIG. 4 makes a chip select signal CS3 low in level. The SDRAM control circuit 32h reads image data out of the SDRAM 34 in a procedure same as that of the camera mode. As a result, image data is read at a clock rate of 24 MHz from the SDRAM 34, which is outputted to the buffer 58 by way of the D-FF circuits 32r–32u and the 3-state buffer 32v. The buffer control circuit 32x also outputs an address signal and write enable signal WE3 to the buffer 58, simultaneously with the output of the image data. This causes the image data to be written into a predetermined address of the buffer 58.

The CPU 68 further instructs the JPEG compression/decompression circuit 60 to compress the image data. Due to this, the JPEG compression/decompression circuit 60 reads image data from the buffer 58, and compresses it by a JPEG scheme, writing the compressed image data onto the buffer 62. Thus, the compressed image data stored within the buffer 62 is read out by the memory control circuit 32 in response to the read request from the JPEG compression/decompression circuit 60, and again written onto the SDRAM 34.

That is, in response to the read request the mediation circuit 32a inputs a predetermined start signal to the processing circuit 32w. Receiving this, the buffer control circuit 32x of FIG. 4 makes the chip select signal CS4 low in level and outputs an address signal to the buffer 62. Also, the SDRAM control circuit 34 turns on the 3-state buffer 32q and inputs an address signal, RAS signal and CAS signal in predetermined timings to the SDRAM 34. Due to this, the compressed image data stored in the buffer 62 is stored to a predetermined address of the SDRAM 34.

If compressed image data is obtained by one frame within the SDRAM 34 in this manner, the CPU 68 fetches this compressed image through a bus bridge 64 and write it to DRAM 70. Specifically, the CPU 68 supplies a read request to the RSFF circuit 32f provided in the memory control circuit 32. In response to the read request, the mediation circuit 32a supplies a predetermined start signal to the processing circuit 32w and enables the bus bridge 64 by a bus-bridge control signal. Due to this, the-compressed image data is read out of the SDRAM 34, and the buses 30 and 66 are connected to each other. The read-out compressed image data is transferred onto the bus 66 side via the bus 30 and bus bridge 64.

Incidentally, the image data compression and compressed data fetching onto the bus 66 side is performed during the ¼ duration for which the bus 30 is released open, as stated before. After transferring all the compressed image data onto the bus 66 side, the mediation circuit 32a disables the bus bridge 64, disconnecting between the bus 30 and the bus 66.

The CPU 68 supplies a predetermined address signal and write enable signal to the DRAM 70, to write the compressed image data fetched onto the bus 66 side to the DRAM 70. After writing the one-frame compressed image data, this compressed image data is read out and written to a memory card 80 via the bus 66 and I/F circuit 78. That is, the CPU 68 accesses the DRAM 70 and the memory card 80 according to a program, thereby recording the DRAM 70 compressed image data to the memory card 80. In this manner, the image data processing way is different on the respective side of the bus bridge 64 as a border. On the bus 30 side image data processing is by DMA whereas on the bus 66 side image data processing is by the CPU 68.

The bus 66 is connected with a PWM signal generating circuit 72, PIO circuit 74, flash memory 76 and asynchronous circuit (UART) 82, besides the CPU 68, DRAM 70 and I/F circuit 78. The PWM signal generating circuit 72 outputs a PWM signal in order to automatically control a focus lens (not shown). The PIO circuit 74 outputs a strobe control signal to flash strobe (not shown) as required. The flash memory 76 holds a program to be processed by the CPU 68. The asynchronous circuit 82 outputs image data to an outside through RS232C. The CPU 68 reads a program from the flash memory 76 and controls the PWM signal generating circuit 72, the PIO circuit 74 and the asynchronous circuit 82 according to the read program.

If the operator sets a mode set switch 86 to a reproduce side, the CPU 68 reproduces from the memory card 80 uncompressed image data. This data, after once held within the DRAM 70, is outputted to the memory control circuit. It is noted that the CPU 68 supplies a write request to the RS-FF circuit 32g of FIG. 3 before reading the compressed image data from the DRAM 70. In response, the mediation circuit 32a enables the bus bridge 64, and supplies a predetermined start signal to the processing circuit 32w. Due to this, the compressed image data read from the DRAM 70 is inputted to the processing circuit 32w via the bus 66, bus bridge 64 and bus 30, and written to the SDRAM 34 by DMA.

The CPU 68 also instructs the JPEG compression/decompression circuit 60 to decompress the compressed image data stored within the SDRAM 34. Due to this, the JPEG compression/decompression circuit 60 supplies read and write requests to the memory control circuit 32, in a manner similar to the above-stated case. The compressed image data stored in the SDRAM 34 is read by the memory control circuit 32 in response to the read request, and thereafter inputted to the JPEG compression/decompression circuit 60 through the buffer 58. The JPEG compression/decompression circuit 60 decompresses the compressed image data bus inputted, and writes a decompressed image data to the buffer 62. The memory control circuit 32 responds to the write request and reads the image data from the buffer 62 and writes it to the SDAM 34. That is, the decompressing the compressed image data stored in the SDRAM 34 and the writing the decompressed image data to the SDRAM 34 is also implemented by DMA.

The CPU 68, in also the reproduce mode, supplies a control pulse to the RS-FF circuit 50b shown in FIG. 3. Due to this, the NTSC encoder 50 inputs a write request to the memory control circuit 32 similarly to the camera mode, and the memory control circuit 32 in turn reads the image data out of the SDRAM 34. In the reproduce mode, no control pulses are supplied to the signal processing circuit 18, and the SDRAM 34 is not updated by the photographic image data. Accordingly, same image data is repeatedly read from the SDRAM 34 whereby a still picture corresponding to the image data reproduced from the memory card 80 is displayed on the monitor 56. Incidentally, if the operator manipulates a frame feed switch 90, another one of the compressed image data is reproduced from the memory card 80, and another still picture is displayed on the monitor 56.

Figure 9:
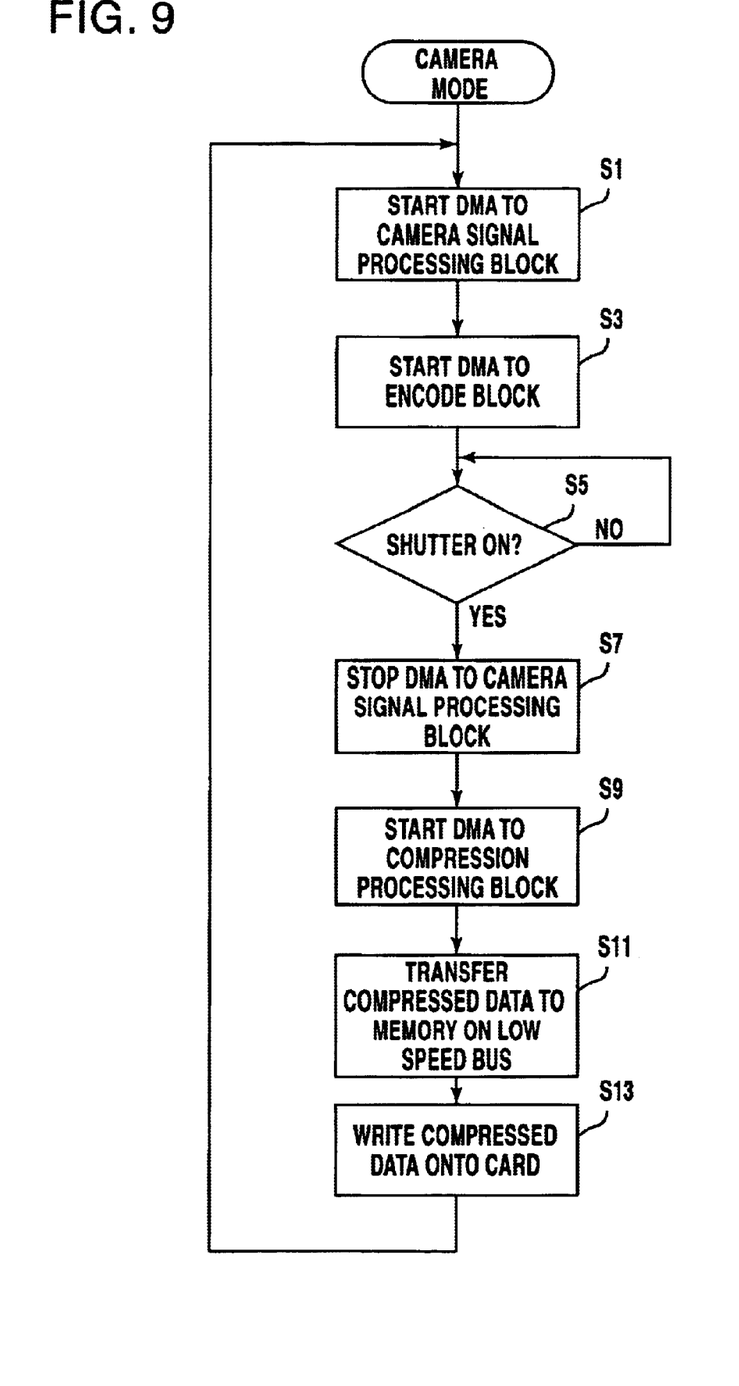
FIG. 9 is a flowchart showing one part of CPU operation.
Figure 10:
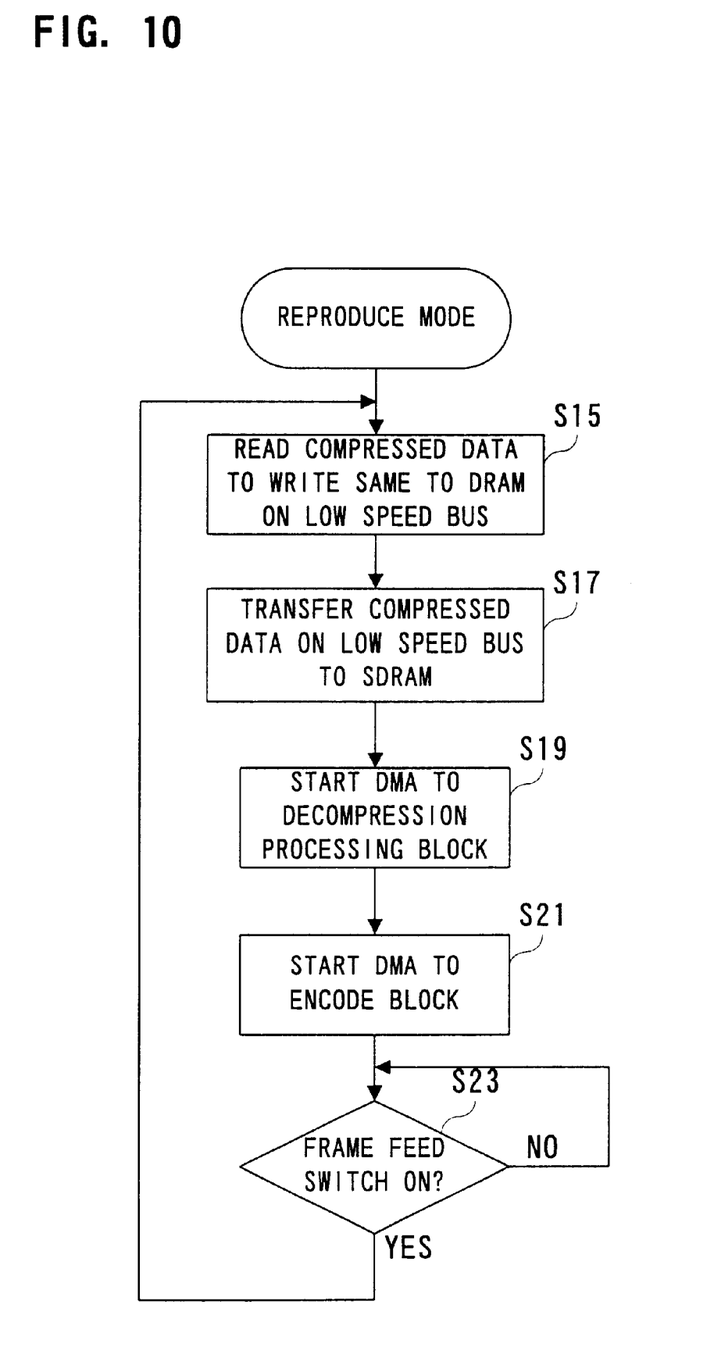
FIG. 10 is a flowchart showing another part of the CPU operation.

The CPU 68 concretely processes on a flowchart as shown in FIG. 9 and FIG. 10. If the mode set switch 86 is set to a camera side, the CPU 68 processes an interrupt routine of FIG. 9. If the mode set switch 86 is set to a reproduce side, the CPU 68 processes an interrupt routine of FIG. 10.

Referring first to FIG. 9, in step S1 is started DMA to a camera signal process block. That is, SG 15 is started to supply a control pulse to the signal processing circuit 18. In response, the signal processing circuit 18 processes photographic image data to write it onto the buffer 28, and supplies a read request to the memory control circuit 32. As a result, the photographic image data is written to the SDRAM 34. The CPU 68 then starts, in step S3, DMA to an encode block. That is, a control pulse is supplied to the NTSC encoder 50. Due to this, the NTSC encoder 50 supplies a write request to the memory control circuit 32. The memory control circuit 32 in turn read the image data from the SDRAM 32 and writes it to the buffer 36. The NTSC encoder 50 further processes the image data written on the buffer 36 and output it onto the monitor 56. As a result, motion pictures are displayed in real time on the monitor 56.

If the shutter button 88 is operated by the operator, the CPU determines in step S5 "YES". In step S7 the DMA to the camera signal process block is stopped, and in step S9 DMA to a compression process block is started. That is, the RS-FF circuit 18b of the signal processing circuit 18 is reset and the RS-FF circuits 60c and 60d of the JPEG compression/decompression circuit 60 are supplied by a control pulse. This suspends the read request from outputting from the signal processing circuit 18 to the memory control circuit 32. Instead, read and write requests are inputted from the JPEG compression/decompression circuit 60 to the memory control circuit 32. In step S9 a compression instruction also is supplied to the JPEG compression/decompression circuit 60 with a result that the SDRAM 34 is written by compressed image data.

The CPU 68 thereafter outputs in step S11 a read request to the memory control circuit 32 to fetch the compressed image data from the SDRAM 34 and temporarily hold it in the DRAM 70. Then in step S13 the compressed image data in the DRAM 70 is recorded on the memory card 80.

In a reproduce mode, firstly in step S15 of FIG. 10 the compressed image data is read out of the memory card 80 and temporarily written onto the DRAM 70. Then in step S17 the compressed image data in the DRAM 70 is given together with the write request to the memory control circuit 32. The compressed image data is stored in the SDRAM 34 by the memory control circuit 32. The CPU 68 subsequently starts in step S19 DMA to a decompression process block. That is, a decompression instruction and to control pulses are given to the JPEG compression/decompression circuit 60. Due to this, the compressed image data of the SDRAM 34 is decompressed by the JPEG compression/decompression circuit 60, and the decompressed image data is again written onto the SDRAM 34.

The CPU 68 thereafter starts, in step S21, DMA to an encode block. At this time, the similar process to the step S3 is executed thereby displaying reproduced image on the monitor 56. If the operator manipulates a frame feed switch 90, the CPU in step S23 determines "YES", and returns to the step S15, to reproduce another one of compressed data from the memory card 80. As a result, renewal is made for on-the-monitor 56 display.

According to this embodiment, image data is processed by DMA on the bus 30 side with reference to the bus bridge 64 as a border. On the bus 66 side, image data, lens focus and strobe are processed in a software manner by the CPU 68. In other words, DMA processing data is transferred through the bus 30 (high speed bus) while CPU processing data is through the bus 66 (low speed bus). Furthermore, the buses 30 and 66 are connected as required with each other by the bus bridge 64. Due to this, the DMA processing data and the CPU processing data can be efficiently transferred thereby increasing the overall process speed.

Incidentally, in this embodiment, the image data transferred from the bus 30 side to the bus 66 side or that reproduced from the memory card was written on the DRAM 70. Alternatively, SRAM may be arranged instead of the DRAM 70. In such a case, the SRAM requires to be connected to the CPU 68.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital camera, comprising:
   an imager for imagining a subject so as to output image data of the subject;
   a displayer for displaying an image corresponding to the image data;
   a compressor for compressing the image data so as to output compressed image data;
   a first bus for connecting said imager, said displayer and said compressor;
   a main memory;
   an assessor connected to said first bus and making access to said main memory in a DMA manner to write/read the image data and the compressed image data;
   a second bus;
   a bus bridge for connecting said first bus and said second bus as required; and
   a CPU connected to said second bus and performing a predetermined processing on the compressed image data according to a program,
   wherein said imager includes a first buffer connected to said first bus, and a writer for writing the image data in said first buffer in the DMA manner, said displayer including a monitor for displaying the image, a second buffer connected to said first bus and temporarily storing the image data, and a data outputter for reading the image data from said second buffer in the DMA manner and output the same onto said monitor, and said compressor includes a third buffer connected to said first bus and temporarily storing the image data, a compression processor for compressing the image data read out from said third buffer, and a fourth buffer connected to said first bus and temporarily storing the compressed image data outputted from said compression processor.

2. A digital camera according to claim 1, further comprising a record instruction inputter for inputting an instruction to record the image data, wherein said CPU, in response to the record instruction disables said imager, enables said compressor, puts said bus bridge into an on state to fetch the compressed image data onto the second bus side and records the compressed image data in a recording medium.

3. A digital camera according to claim 1, further comprising a focus controller connected to said second bus and controlling a focus according to an instruction by said CPU, and a strobe controller connected to said second bus and controlling a strobe according to an instruction by said CPU.

4. A digital camera according to claim 1, further comprising an outputter connected to said second bus and outputting the compressed image data onto an outside according to an instruction by said CPU.

5. A digital camera according to claim 1, wherein said accessor includes a buffer accessor for making access to said first to fourth buffers in the DMA manner, and a main memory accessor for making access to said main memory in the DMA manner.

6. A digital camera according to claim 5, wherein said imager further includes a first request outputter for outputting a read request to read the image data stored in said first buffer, and said buffer accessor reading the image data from said first buffer in response to the read request.

7. A digital camera according to claim 5, wherein said displayer further includes a second request outputter for outputting a write request to write the image data to said second buffer, and said buffer accessor writing the image data to said second buffer in response to the write request.

8. A digital camera according to claim 5, wherein said compressor further includes a third request outputter for outputting a write request to write the image data onto said third buffer, and a fourth request outputter for outputting a read request to read the compressed image data stored in the fourth buffer, and said buffer accessor writing the image data onto said third buffer in response to the write request from the third request outputter and reading the compressed image data out of said fourth buffer in response to the read request from said fourth request outputter.

9. A digital camera according to claim 8, further comprising a record instruction inputter for inputting an instruction to record the image data, wherein said accessor includes an on/off controller for turning on/off said bus bridge, said CPU responding to the record instruction to disable said first request outputter, enable said third request outputter and said fourth request outputter, cause said on/off controller to bring said bus bridge into an on state, and request said accessor to read out the compressed image data.

10. A digital camera, comprising:
    an imager for imaging a subject so as to output image data of the subject;
    a displayer for displaying an image corresponding to the image data;

a compressor for compressing the image data so as to output compressed image data;

a first bus for connecting said imager, said displayer and said compressor;

a main memory;

an accessor connected to said first bus and making access to said main memory in a DMA manner to write/read the image data and the compressed image data;

a second bus;

a bus bridge for connecting said first bus and said second bus as required; and a CPU connected to said second bus and performing a predetermined processing on the compressed image data according to a program, wherein said compressor includes a first buffer connected to said first bus and temporarily storing the image data, a compression processor for compressing the image data read out from said first buffer, and a second buffer connected to said first bus and temporarily storing the compressed image data outputted from said compression processor.

11. A digital camera according to claim 10, wherein said imager includes a third buffer connected to said first bus, and a writer for writing the image data in said third buffer in the DMA manner.

12. A digital camera according to claim 10, wherein said displayer includes a monitor for displaying the image, a fourth buffer connected to said first bus and temporarily storing the image data, and a data outputter for reading the image data from said fourth buffer in the DMA manner and output the same onto said monitor.

13. A digital camera, comprising:

an imager for imaging a subject so as to output image data of the subject;

a displayer for displaying an image corresponding to the image data;

a compressor for compressing the image data so as to output compressed image data;

a first bus for connecting said imager, said displayer and said compressor;

a main memory;

an accessor connected to said first bus and making access to said main memory in a DMA manner to write/read the image data and the compressed image data;

a second bus;

a bus bridge for connecting said first bus and said second bus as required; and a CPU connected to said second bus and performing a predetermined processing on the compressed image data according to a program to produce a still picture.

* * * * *